Sept. 15, 1953     R. L. BROWNING     2,652,132
BRAKE MECHANISM
Original Filed Oct. 6, 1943      2 Sheets-Sheet 1
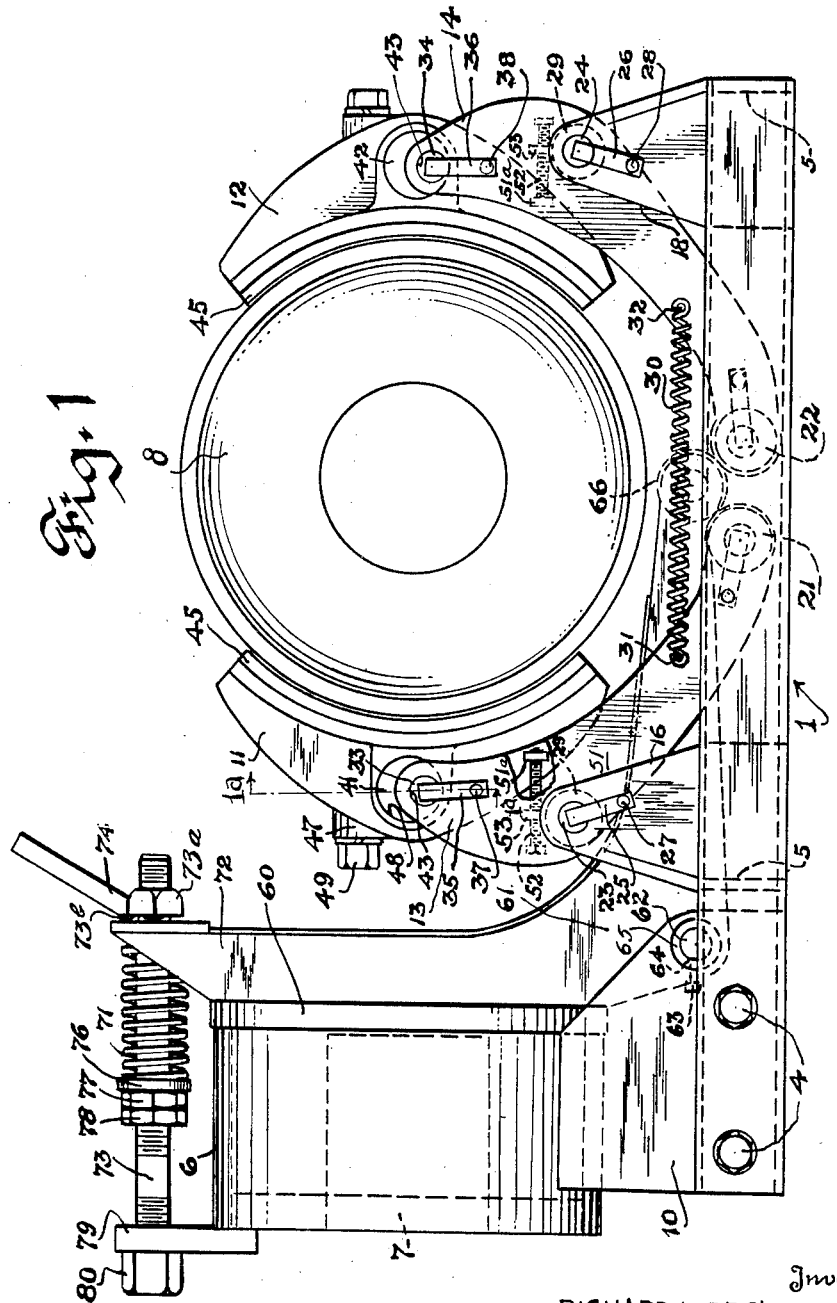
Inventor
RICHARD L. BROWNING
By  Geo. B. Pitts
Attorney Sept. 15, 1953   R. L. BROWNING   2,652,132
BRAKE MECHANISM
Original Filed Oct. 6, 1943   2 Sheets-Sheet 2

INVENTOR
RICHARD L. BROWNING.
By Geo. B. Pitts
Attorney

Patented Sept. 15, 1953

2,652,132

UNITED STATES PATENT OFFICE 2,652,132

BRAKE MECHANISM

Richard L. Browning, Euclid, Ohio, assignor to Victor R. Browning & Company, Incorporated, Willoughby, Ohio, a corporation of Ohio Original application October 6, 1943, Serial No. 505,089. Divided and this application February 18, 1949, Serial No. 77,201

5 Claims. (Cl. 188—75)

This invention relates to a braking mechanism. In its preferred form it comprises a brake held inactive by means associated with the driving mechanism of the apparatus to which the brake is attached and rendered operative to retard or stop such apparatus upon the shutting down of the driving mechanism. The invention is peculiarly adapted for use in connection with a hoist mechanism driven by an electric motor wherein a magnetic unit in circuit with the motor normally holds the brake inactive, but which serves to release the brake to operative position through spring action or the like when the motor switch is moved to stop the motor and de-energize the magnetic unit. The invention includes precision adjustment of the brake-shoe spacing and plane of operation, as well as the limit of free movement of the brake-shoes, and provides broad bearing surfaces for the pivot elements to insure long service life.

The principal object of the present invention is to simplify and improve the construction of braking mechanism for use on various types of apparatus, including cranes and hoisting apparatus.

Another object of the invention is to provide an improved braking mechanism consisting of few parts particularly adapted for easy and ready assembly and installation of the brake shoes, adjustment thereof and readily accessible for inspection or replacement.

Another object of the invention is to provide an improved mounting for a brake shoe of simplified construction and readily adjusted to position the brake shoe in predetermined relation to its brake drum or wheel from time to time due to wear of the shoe lining whereby non-uniform wear of the lining is eliminated.

Another object of the invention is to provide an improved mounting for a brake shoe capable of adjustment to relate the shoe to its drum or wheel independently of the brake shoe operating mechanism.

Another object of the invention is to provide a pair of brake levers carrying brake-shoes on eccentric elements adapted for ready adjustment and supporting said brake-shoes on broad bearing elements thereby, reducing the wear upon the associated parts.

Other objects of the invention will be apparent to those skilled in the art to which my invention relates from the following description taken in connection with the accompanying drawings, wherein Fig. 1 is a side elevation of a brake apparatus embodying the principles of the invention;

Figure 2:
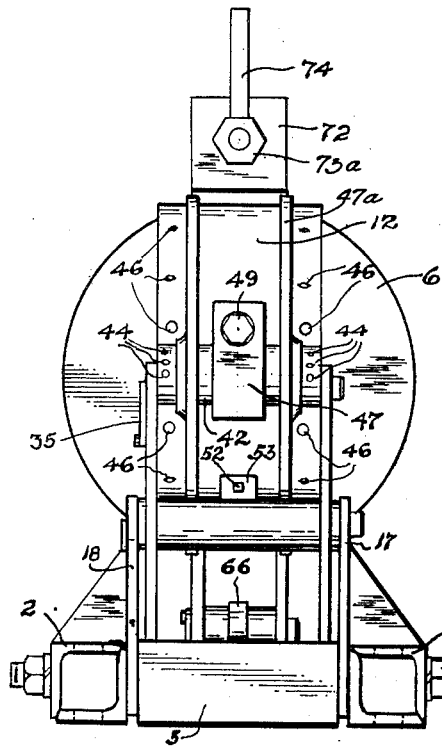
Fig. 2 is an end view of the apparatus shown in Fig. 1 as seen from the right-hand side.

As is clearly shown in the drawings, the automatic brake apparatus may be embodied in a skeletonized structure 1 comprising side frames formed of pairs of angle bars welded to form rectangular side bars 2, 3, having a plurality of standards with spacing members 5. A removable frame section 10, bolted to the main frame by pairs of bolts 4, supports a magnet housing 6, having therewithin a magnet coil 7, the latter being preferably connected with the motor (not shown) with which is associated the brake drum 8. The units may be variously connected but preferably the motor is in series with the magnet and the magnet when energized releases the brake-shoes from the drum, as will be presently described.

Figure 4:
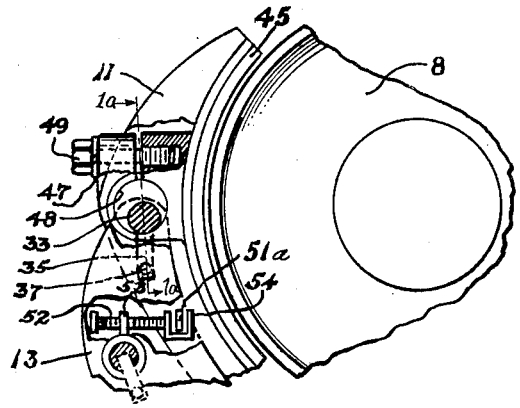
Fig. 4 is a fragmentary sectional view of the brake-shoe adjusting mechanism.
Figure 1A:
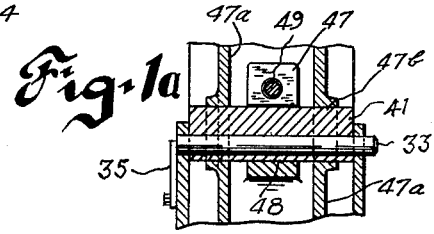
Fig. 1a is a fragmentary section on the line 1a—1a of Figs. 1 and 4.
Figure 3:
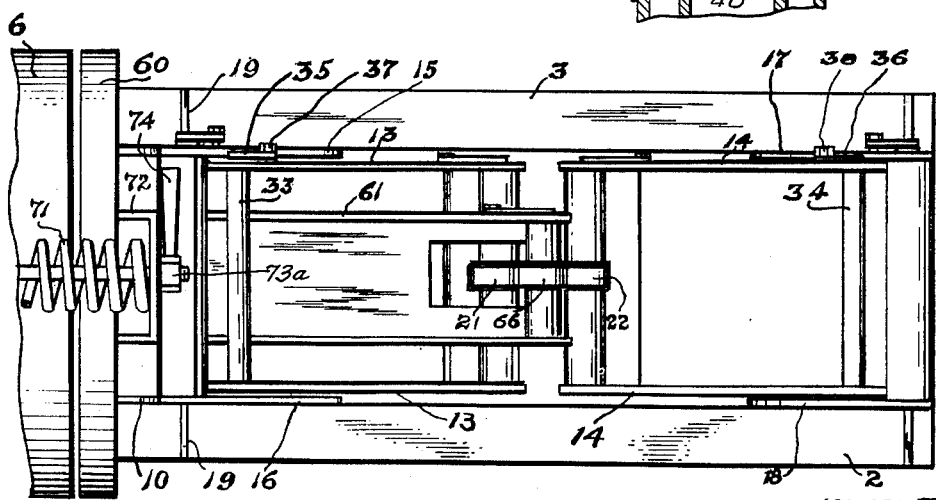
Fig. 3 is a fragmentary diagrammatic plan view of the apparatus with brake-shoes and brake drum removed.

The brake-shoes 11, 12, are each carried on pivoted frame members 13, 14, of bell-crank shape supported between pairs of side plates or standards 15, 16, and 17, 18, respectively, welded at spaced points to the side frame bars 2, 3, and preferably having gusset plates 19. The free ends of the bell-crank frame members are turned toward each other and carry rollers 21, 22, respectively, in closely spaced relation centrally between the side bars 2, 3. The pivots 23, 24, for the respective bell-crank frames are adjacent the lower portions of their upright sections and comprise pivot pins engaged through apertures in the upper portions of the pairs of standards 15, 16, and 17, 18, respectively. The pivot pins 23, 24, are provided with terminal bars 25, 26, respectively, at one end and the bars in turn carry locking bolts 27, 28, respectively, engageable in suitable apertures on the adjacent standards referred to, respectively. Suitable hardened bushings 29 are frictionally engaged in the bell-crank frames and are engaged over the hardened pins to reduce wear to a negligible amount. The angle sections of the bell crank frame members 13, 14, are connected to each other by a light spring 30, having its ends engaged over studs 31, 32, spaced inwardly of and a slight distance from the rollers 21, 22, at a central position, on the adjacent ends of the members 13, 14. A similar spring may be used on each side of the members 13, 14, for balanced action. At the upright ends of the bell-crank members 13, 14, pivot pins 33, 34, are provided having terminal bars 35, 36, respectively with locking bolts 37, 38, respectively, engaging the frame members 13, 14. The pivot pins revolubly support cylindrical adjusting members 41, 42, each having an off-center or eccentric bore 43 through which the adjacent pin extends. Each adjusting member 41, 42, is formed adjacent its opposite ends with radially disposed apertures 44 (see Fig. 2) adapted to receive a suitable tool, whereby the member may be adjusted about the adjacent pin. The brake-shoes 11, 12, are of conventional arcuate shape and have suitable friction linings 45, each secured to the body of the adjacent shoe by suitable fastening means, such as rivets 46. The rear side or wall of each brake shoe is enlarged centrally to form a boss 47 and provided with longitudinally extending ribs 47a at opposite sides of the boss. The boss 47 is formed with a transverse aperture 48 and the ribs 47a are formed with openings 47b alined with the aperture 48. The openings 47b and aperture 48 are of a size to receive the cylindrical adjusting member 41 or 42, above mentioned, for spacing the adjacent shoe from the brake drum 8. In this arrangement, the opposite end portions of the adjacent eccentric member are rotatably mounted in the openings 47b, whereby it may be adjusted about the axis of the adjacent pivot pin, and thus support the shoe in relation to the drum 8 for effective braking engagement therewith. By preference, each eccentric member 41, 42, is adjustably fixed to the walls of the adjacent aperture 48. For this purpose, the transverse aperture 48 may be in the form of a split socket, whereby, by means of a bolt 49, the adjacent eccentric member may be secured to the boss 47 after it is adjusted at the proper angle to space the brake-shoe a predetermined distance from the brake drum 8. As shown in Figs. 1a and 2, the eccentric member 41 extends outwardly beyond the ribs 47a, so as to provide for an adjustment of the shoe axially of the adjacent pivot pin and eccentric member, parallel to the axis of the drum 8, to insure alinement with the latter and compensate for end play of the shaft to which the drum 8 is keyed or otherwise secured. By loosening the bolt 49, the eccentric member may be adjusted as above set forth and/or the brake-shoe adjusted axially thereof in operative relation to the drum 8. It will be thus noted that the lateral position of the brake-shoe on the drum as well as its spacing from the drum is adjusted preliminary to tightening the clamping bolt 49. The radial apertures 44 permit rotation of the eccentric members by means of a bar or similar instrument to a position or precise spacing of each brake-shoe from the surface of the brake drum. 51 indicates as an entirety means between each bell-crank member 13, 14, and the adjacent brake-shoe for preventing downward movement of the brake-shoe and thus allow the motor armature, where the brake is applied, to be removed or a replacement thereof made, without any change of adjustment of the brake-shoe. Accordingly, such repair or replacement may be expedited, so that in the case of an emergency condition, the great expense, which would otherwise result from a long tie up of the mechanism and stoppage of operations being carried out, is eliminated. The means 51, as shown in Fig. 1, consist of an extension or lug 51a on one side and adjacent the lower end portion of each brake-shoe and an adjusting bolt 52, screw-threadedly engaged in an extension plate or nut 53 fixedly mounted on the central portion of the adjacent bell-crank frame member, the outer end of the bolt being in engagement with the lug 51a to limit the pivotal movement downwardly of the adjacent brake-shoe. Thus it will be observed that the adjusting screws 52 provide means of rotating the shoes 11 and 12 about the pins 33, 34, thereby making possible the equalizing of clearance between brake wheel 8 and brake linings 45. The center of gravity of each brake-shoe 11, 12, is toward the brake wheel 8, thereby keeping the shoe in contact with the adjacent adjusting screw 52 (when brake-shoe is in released position) due to its own weight. Since each screw 52 moves axially by its rotation in the adjacent nut 53, which is a part of the adjacent frame member and makes contact with the lug 51a, which is a part of the adjacent shoe, such axial movement causes shoe 11 to move about its supporting pin. In Fig. 4, I show a modified form of limiting means wherein a U-shaped plate terminal 54 is swivelled on the shoe and is used to limit upward as well as downward movement and vibration of the brake-shoe. The means for moving the brake-shoes toward and against the drum 8 is provided by an independent removable frame unit, having an armature frame 61 carrying an armature 60. The frame 61 is fulcrumed on the frame section 10 by means of a pivot pin 62 held by a set-screw 63 seated against a flattened area 64 thereon. The lower end of the armature frame 61 is extended and projects through an opening formed in the frame member 13 below the pivot pin 23 therefor so as to terminate in a plane above the rollers 21, 22, as shown in Fig. 1. A hardened bushing 65 is frictionally engaged in the armature frame which, it will be noted, oscillates the slight distance necessary to apply or release braking pressure. The extreme lower end of the armature frame 61 supports a pressure roller 66 at a central position immediately above and in alinement with the rollers 21, 22 (see Figs. 1 and 3), which are mounted in closely spaced relation on the respective free ends of the bell-crank frame members 13, 14, carrying the brake-shoes. The rollers 66, and 21, 22, are all preferably ball-bearing units, mounted on parallelly related axes and are of substantial width. The roller 66 is preferably of approximately the diameter of the rollers 21, 22, and traverses a path of movement in the plane of and between the rollers 21, 22. Thus, while the independent bell-crank frame unit, in the preferred form of construction, is not positively connected with the brake-shoe operating members 13, 14, it has in effect a toggle action against said members increasing in effectiveness progressively with the amount of movement of the frame 61 and the degree of separation of the rollers 21 and 22. The means for controlling the armature frame 61 may vary with the structure to which it is applied, but in the apparatus illustrated and adapted for use in cranes and hoisting apparatus, it is moved to braking position by a compression spring 71 when the armature 60 is released by the magnet 7.

The armature frame 61 is provided at a central position with an upright channel bar 72 the upper end of which is formed with an aperture for one end portion of a rod 73, formed of non-magnetic material and having a screw-threaded end section on which is mounted a nut 73a having a combined spring tensioning hand lever 74 and emergency brake release, the nut 73a engaging a washer 73b on the outer side of the bar 72. A compression spring 71 is coiled around the rod 73, and at one end abuts the inner side of the bar 72, whereas its opposite end abuts a non-magnetic washer 76 seated against a pair of spring abutment nuts 77, 78 (also formed of non-magnetic material) engaged on the screw-threaded rod 73. Under normal operation, the nut 73a is so positioned on the rod 73 that when the drum 8 is being driven and brake-shoes 11, 12, are disengaged therefrom (see Fig. 1) as already set forth, the nut 73a and washer 73b are spaced from the channel bar 72, to permit rocking of the frame 61 about its fulcrum 62, under the influence of the spring 71, when the coil 7 is de-energized, and movement of the bar 72 a predetermined distance, whereby operation of the roller 66, through rollers 21, 22, applies the brake-shoes to the drum 8. The outer end of the rod 73 is screw-threadedly engaged in a terminal plate 79 on the armature housing 6, to which it is fastened by means of a terminal nut 80. The channel bar upright 72 is preferably welded to the armature 60.

The operation of the apparatus has been indicated in the description of the structural parts, but may be briefly summarized as relates to the form of construction illustrated as follows. When the switch is turned to energize the motor, the magnet 7 is also energized and the armature 60 is attracted to the magnet. As the compression spring 71 is further compressed and the upright portion or bar 72 of the armature frame moves toward the magnet the lower end of the armature frame carrying the roller 66 is moved away from the rollers 21, 22. The light tension spring 30, then turns the bell-crank members 13, 14, carrying the brake-shoes 11, 12, away from the brake drum 8 and the apparatus operates freely until the motor is shut down. When the current is cut off, the magnet will be de-energized and the compression spring 71 will force the armature frame away from the magnet, depressing the roller 66 and forcing the rollers 21 and 22 outwardly to operate the upper portions of the bell-crank members carrying the brake-shoes 11, 12, into pressure applying movement toward the brake drum. As will be observed the braking pressure is increased in effectiveness with the degree of movement of the roller 66 against the rollers 21, 22. This also compensates for the reduction in pressure of the expansion spring in its movement toward a free-length position. The movement of the roller 66 is positive against the two rollers 21, 22, and if the associated mechanism of either roller 21 or 22 fails, the full pressure of the roller 66 will be applied to the other roller of the pair and full braking pressure thus applied through a single shoe. This differs from units which become inoperative when one unit of the pair fails.

The apparatus provides a structure of great strength and of relatively light weight. Through the use of bell-crank members with roller terminals and with the pressure applying frame nested within the brake-shoe carrying members a very compact structure results without loss of leverage. The degree of movement of the parts, as well as the number of structural parts, is reduced to a minimum. This also facilitates the manufacture of the device and its assembly and maintenance. This is of particular importance in connection with the use of the apparatus on cranes and hoisting mechanism, where compactness and speedy dependable operation are essential.

While applicant has described one form of combination embodying the invention, it is not intended to restrict the invention to an electromagnetic brake operating mechanism, inasmuch as a mechanical or a fluid operated mechanism may be used to advantage.

This application is a division of my application filed October 6, 1943, Ser. No. 505,089, now Letters Patent No. 2,491,859, dated December 20, 1949.

Other modes of applying the principle of my invention may be employed instead of those explained, change being made as regards the structure and apparatus herein disclosed, provided the means stated by any of the following claims or the equivalent of such stated means be employed.

What I claim is:

1. In a brake mechanism, the combination with a frame, spaced supports on said frame and a brake drum rotatably mounted on said frame between said supports, of levers disposed in the plane of said drum and each fulcrumed intermediate its ends on one of said supports, each of said levers terminating at one end in spaced arms having alined bearings, a brake shoe disposed between the arms of each lever in the plane of said drum and adapted to engage and disengage the latter, a boss on the rear side of each of said brake shoes intermediate its ends and formed with a through transverse opening, a device rotatably fitting and extending through the opening in each of said bosses, and extensions on the opposite ends of each of said devices disposed eccentrically to the axis thereof and rotatably mounted in said adjacent bearings, the rotation of each said device serving to adjust the adjacent shoe relative to said drum.

2. A mechanism as claimed in claim 1 wherein one end of each of said devices is provided with elements adapted to be engaged by a tool to effect rotative adjustment thereof in said transverse opening.

3. In a braking mechanism, the combination with a frame, spaced supports thereon and a brake drum mounted on said frame between said supports, of levers disposed in the plane of said drum and each fulcrumed intermediate its opposite ends on one of said supports, each of said levers terminating at one end in spaced arms having alined bearings, a brake shoe disposed between the arms of each of said levers in the plane of said drum and adapted to engage and disengage the latter, a boss on the rear side of each of said brake shoes intermediate its opposite ends and formed with a through transverse opening, a pin mounted at its opposite ends in the bearings in the arms of each of said levers, an eccentric extending through and rotatably fitting the opening in each of said bosses and formed with a through opening the walls of which engage and rotate on the adjacent pin, and elements provided on one end of each of said eccentrics for revolving the latter about the adjacent pin to adjust the adjacent brake shoe relative to said drum.

4. A mechanism as claimed in claim 1 wherein each of said bosses is slidable endwise of the adjacent device to adjust the adjacent shoe laterally relative to said drum.

5. A mechanism as claimed in claim 1 wherein means are provided for securing each of said rotatable devices to the wall of the adjacent transverse opening.

RICHARD L. BROWNING.

References Cited in the file of this patent

UNITED STATES PATENTS

| Number | Name | Date |
|---|---|---|
| 1,646,932 | Rosenberg | Oct. 25, 1927 |
| 1,672,314 | Hall | June 5, 1928 |
| 1,734,754 | Thompson | Nov. 5, 1929 |
| 2,285,134 | Williams | June 2, 1942 |
| 2,357,212 | Magee | Aug. 29, 1944 |
| 2,444,313 | Rotenberger | June 29, 1948 |
| 2,491,850 | Browning | Dec. 20, 1949 |